United States Patent
Matsumoto

(10) Patent No.: US 10,984,232 B2
(45) Date of Patent: Apr. 20, 2021

(54) APPARATUS FOR SETTING FILE NAME AND THE LIKE FOR SCAN IMAGE, CONTROL METHOD THEREOF, AND STORAGE MEDIUM

(71) Applicant: CANON KABUSHIKI KAISHA, Tokyo (JP)

(72) Inventor: Yoshitaka Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 16/103,695

(22) Filed: Aug. 14, 2018

(65) Prior Publication Data
US 2019/0065843 A1  Feb. 28, 2019

(30) Foreign Application Priority Data
Aug. 22, 2017 (JP) .............................. JP2017-159537

(51) Int. Cl.
*G06K 9/00* (2006.01)
*G06K 9/20* (2006.01)
(Continued)

(52) U.S. Cl.
CPC ....... *G06K 9/00469* (2013.01); *G06K 9/2081* (2013.01); *G06K 9/6878* (2013.01);
(Continued)

(58) Field of Classification Search
None
See application file for complete search history.

(56) References Cited

U.S. PATENT DOCUMENTS

| 8,224,131 B2 * | 7/2012 | Maekawa | ............ G06K 9/6842 382/321 |
| 8,593,686 B2 * | 11/2013 | Kanemoto | ............... H04N 1/46 358/1.9 |

(Continued)

FOREIGN PATENT DOCUMENTS

JP  2015-215878  12/2015

OTHER PUBLICATIONS

U.S. Appl. No. 16/100,943, filed Aug. 10, 2018.
U.S. Appl. No. 16/103,692, filed Aug. 14, 2018.
U.S. Appl. No. 16/139,996, filed Sep. 24, 2018.

*Primary Examiner* — Hadi Akhavannik
(74) *Attorney, Agent, or Firm* — Venable LLP

(57) ABSTRACT

In a situation of setting a file name and the like by using a character string obtained by performing OCR processing to a scan image, appropriate conditions can be set according to a character string to be scanned so as to increase a character recognition rate. There is provided an apparatus for performing a predetermined process to a scan image obtained by scanning a document, including: a display control unit configured to display a UI screen for performing the predetermined process, the UI screen displaying a character area assumed to be one continuous character string in the scan image in a selectable manner to a user; and a setting unit configured to determine a condition for OCR processing based on selection order of a character area selected by a user via the UI screen and a format of supplementary information for the predetermined process, perform OCR processing by using the determined condition for OCR processing to the selected character area, and set supplementary information for the predetermined process by using a character string extracted in the OCR processing.

14 Claims, 14 Drawing Sheets

(51) Int. Cl.
   *G06K 9/68*      (2006.01)
   *H04N 1/00*      (2006.01)
(52) U.S. Cl.
   CPC ..... *G06K 2209/01* (2013.01); *H04N 1/00331* (2013.01); *H04N 1/00461* (2013.01); *H04N 2201/0094* (2013.01)

(56) References Cited

U.S. PATENT DOCUMENTS

| | | | | |
|---|---|---|---|---|
| 2002/0037097 | A1* | 3/2002 | Hoyos | G06K 9/00463 382/137 |
| 2005/0024679 | A1* | 2/2005 | Yoda | G06K 9/20 358/1.15 |
| 2007/0195370 | A1* | 8/2007 | Suga | G06F 40/174 358/1.18 |
| 2009/0110279 | A1* | 4/2009 | Jain | G06K 9/2054 382/176 |
| 2012/0087537 | A1* | 4/2012 | Liu | G06K 9/00469 382/100 |
| 2015/0302277 | A1* | 10/2015 | Suzuki | G06K 9/2081 382/229 |

\* cited by examiner

FIG.7A

Preview Screen — 700

File Name Format Settings — 701, 702
⚙ — 703

← 711    + 713    − 714    → 712
Next — 721

Order Form

Messrs. Tokyo Corporation        Order No.
                                 112014-90002

Proposed Delivery Date           Yokohama Corporation

04/14/2017                       Yokohama City 1000-1

Back — 720

<document type>_<company name>_<delivery date>

FIG.11A

OrderForm_<company name>_<delivery date>

FIG.11B

OrderForm_TokyoCorporation_<delivery date>

FIG.11C

OrderForm_TokyoCorporation_04142017

FIG.11D

APPARATUS FOR SETTING FILE NAME AND THE LIKE FOR SCAN IMAGE, CONTROL METHOD THEREOF, AND STORAGE MEDIUM

BACKGROUND OF THE INVENTION

Field of the Invention

The present invention relates to a technique of using a character recognition result of a scan image and setting a file name and the like for the scan image.

Description of the Related Art

Traditionally, a method of scanning and digitizing a paper document has widely been used as a document managing method. Further, in digitizing a document, there is a technique of performing character recognition processing (OCR processing) to scanned image data and using recognized characters for a file name of a digitized document file. For example, Japanese Patent Laid-Open No. 2015-215878 discloses a technique of presenting a scan image obtained by scanning a document to a user to specify an area, performing OCR processing to the specified area to obtain a character string, and using the character string for a file name of the scan image.

In OCR processing, according to predetermined condition settings, a process of extracting a character string is performed on every area of one continuous character string (character area) in a scan image. On this occasion, in a case where condition settings to be applied are not suitable for each area to be scanned, possibility of error recognition may increase. Now, a specific example will be described. In an example of FIG. 1, areas corresponding to character strings of "Order Form," "TokyoCorporation," and "112014-90002" are specified in this order. A user originally intends that a character string of a content of "OrderForm_TokyoCorporation_112014-90002" be displayed (automatically inputted) in a file name input field 10. In reality, however, a content of "OrderForm_TokyoCorporation_H2014-9000Z" is displayed, which is the result of error recognition in the third specified area. This is because the condition settings for the OCR processing on the assumption of the English language are made (i.e. the condition settings are OCR settings for recognizing both of alphabets and numbers), and thus the third specified area includes some noises. In this respect, in the above-mentioned Japanese Patent Laid-Open No. 2015-215878, edit operation (deletion and addition of a character, etc.) by using a keyboard or the like may be performed to a character string obtained by the OCR processing. However, if there is a method with a decreased probability of error recognition in OCR processing in the first place, such a method is superior in terms of increased convenience for users.

The present invention has been made to solve the above problem, and an object of the present invention is to allow appropriate conditions to be set according to a character string to be scanned and to increase a character recognition rate, in a situation of setting a file name and the like by using a character string obtained by performing OCR processing to a scan image.

SUMMARY OF THE INVENTION

According to the present invention, there is provided an apparatus for performing a predetermined process to a scan image obtained by scanning a document, including: a display control unit configured to display a UI screen for performing the predetermined process, the UI screen displaying a character area assumed to be one continuous character string in the scan image in a selectable manner to a user; and a setting unit configured to determine a condition for OCR processing based on selection order of a character area selected by a user via the UI screen and a format of supplementary information for the predetermined process, perform OCR processing by using the determined condition for OCR processing to the selected character area, and set supplementary information for the predetermined process by using a character string extracted in the OCR processing.

Further features of the present invention will become apparent from the following description of exemplary embodiments with reference to the attached drawings.

BRIEF DESCRIPTION OF THE DRAWINGS

FIG. 7A and FIG. 7B show examples of a preview screen;

FIG. 11A to FIG. 11D show display examples of a file name input field; and

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<Configuration of an Image Processing System>

Figure 2:
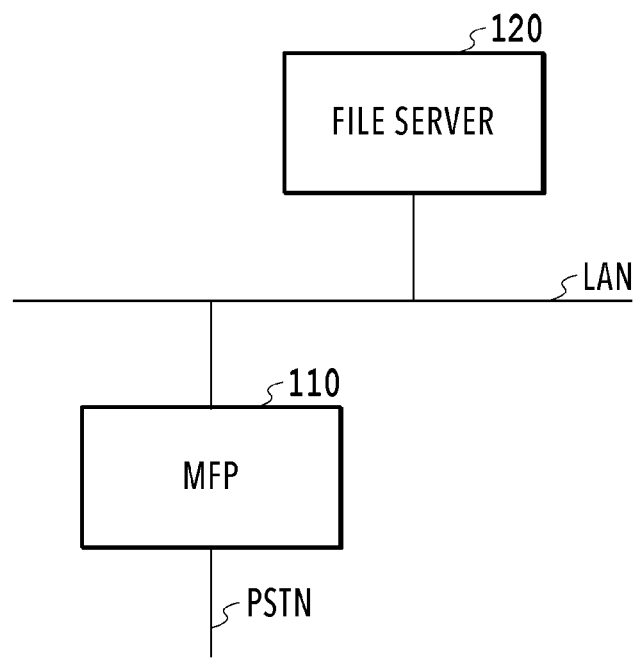
FIG. 2 is a diagram illustrating an entire configuration of an image processing system.

FIG. 2 is a diagram illustrating an entire configuration of an image processing system according to the present embodiment. The image processing system is composed of a MFP 110 and a file server 120, which are connected to each other via a LAN (Local Area Network) for communication.

The MFP (Multi Function Printer) 110 is multifunction equipment having a plurality of functions such as a scanner and a printer, and is an example of an image processing apparatus. The file server 120 is an example of an external server that stores and manages a digitized document file. The image processing system of the present embodiment is composed of the MFP 110 and the file server 120, but is not limited to this. For instance, the MFP 110 may also serve as the file server 120. Further, a connection form via, for example, the Internet, instead of the LAN, may be employed. Furthermore, the MFP 110 is connected to PSTN (Public Switched Telephone Networks) and can transmit and receive image data via facsimile to and from a facsimile machine (not shown).

Figure 3A:
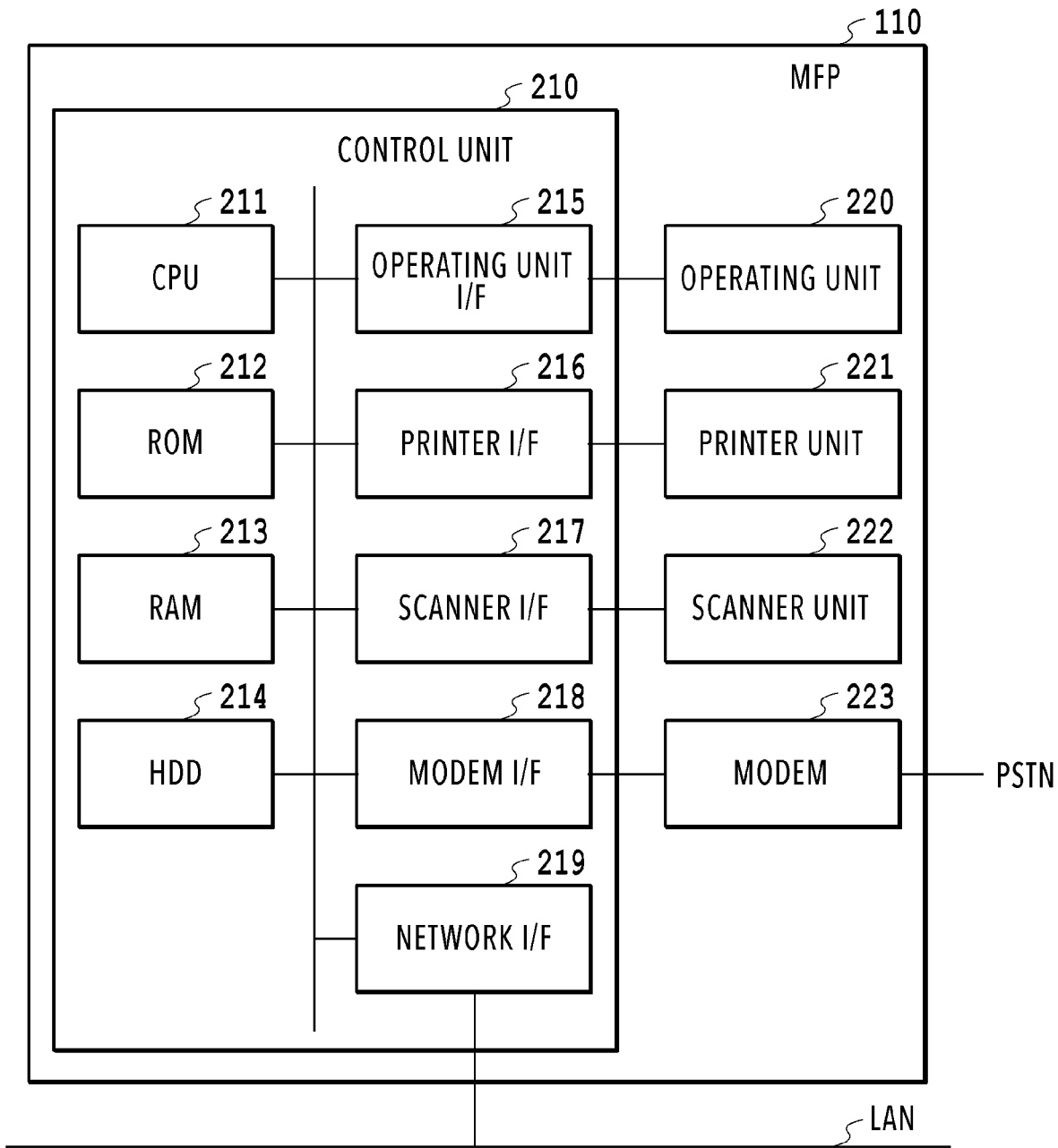
FIG. 3A is a diagram illustrating a hardware configuration of a MFP.

FIG. 3A is a diagram of a hardware configuration of the MFP 110. The MFP 110 is composed of a control unit 210, an operating unit 220, a printer unit 221, a scanner unit 222, and a modem 223. The control unit 210 is composed of the following units 211 to 219 to control the entire operation of the MFP 110. A CPU 211 loads a control program stored in a ROM 212 and executes and controls the various functions of the MFP 110 such as scanning, printing, and communication. A RAM 213 is used as a main memory of the CPU 211 or a temporary storage area such as a work area. It should be noted that in the present embodiment, one CPU 211 uses one memory (RAM 213 or HDD 214) to perform each process shown in the flowchart as will be described later, but the present invention is not limited to this. For example, a plurality of CPUs may perform processes with a plurality of RAMs or HDDs working together. The HDD 214 is a large capacity storage unit for storing image data and various programs. An operating unit I/F 215 is an interface connecting the operating unit 220 and the control unit 210. The operating unit 220 has a touch panel, a keyboard, and the like and receives an operation, input, and instruction by a user. A printer I/F 216 is an interface connecting the printer unit 221 and the control unit 210. Image data for printing is transferred from the control unit 210 to the printer unit 221 via the printer I/F 216 and printed on a print medium. A scanner I/F 217 is an interface connecting the scanner unit 222 and the control unit 210. The scanner unit 222 scans a document set on a platen or ADF (Auto Document Feeder) (not shown) to generate image data and inputs to the control unit 210 via the scanner I/F 217. The MFP 110 can not only print output (copy) the image data generated by the scanner unit 222 from the printer unit 221 but also transmit a file of the image data or transmit the image data via email. A modem I/F 218 is an interface connecting the modem 223 and the control unit 210. The modem 223 transmits and receives image data via facsimile to and from a facsimile machine over PSTN. A network I/F 219 is an interface connecting the control unit 210 (the MFP 110) to the LAN. The MFP 110 transmits image data and information and receives various types of information to and from an external apparatus (e.g., the file server 120) on the LAN by using the network I/F 219.

Figure 3B:
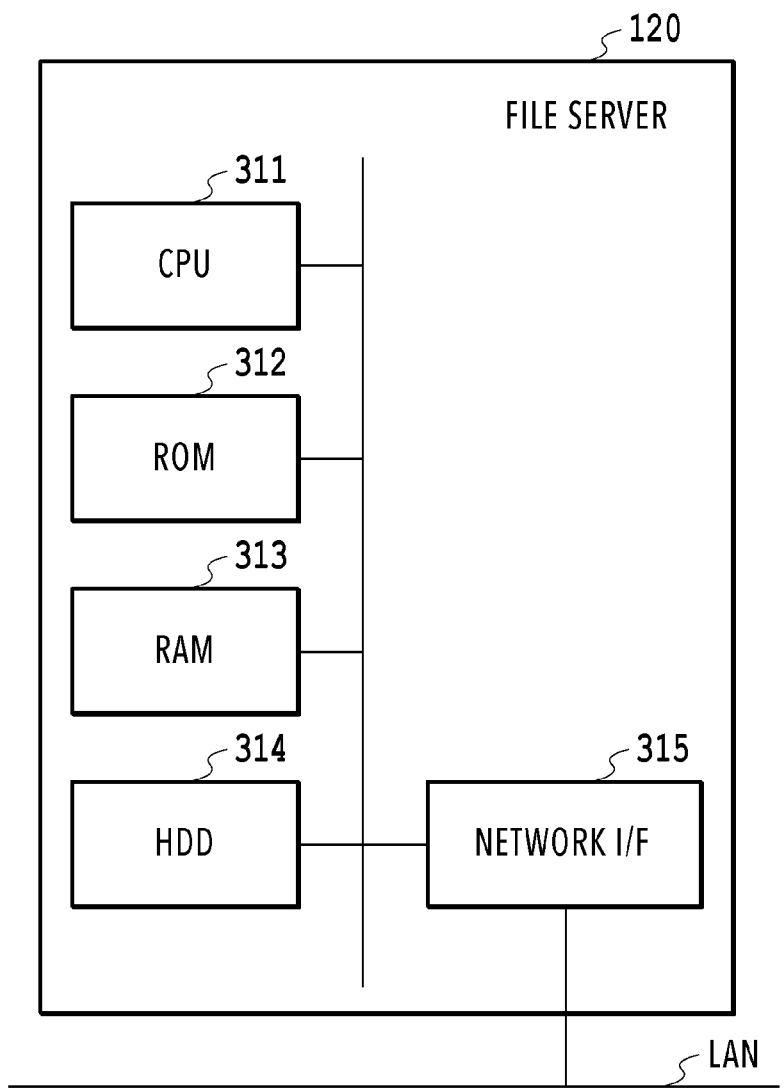
FIG. 3B is a diagram illustrating a hardware configuration of a file server.

FIG. 3B is a diagram of a hardware configuration of the file server 120. The file server 120 is composed of a CPU 311, a ROM 312, a RAM 313, a HDD 314, and a network I/F 315. The CPU 311 loads control programs stored in the ROM 312 and performs various processes to control the entire operation of the file server 120. The RAM 313 is used as a main memory of the CPU 311 or a temporary storage area such as a work area. The HDD 314 is a large capacity storage unit for storing image data and various programs. The network I/F 315 is an interface connecting the file server 120 to the LAN. The file server 120 transmits and receives various types of information to and from other apparatuses (e.g., the MFP 110) on the LAN by using the network I/F 315.

<Software Configuration of the MFP>

Figure 4:
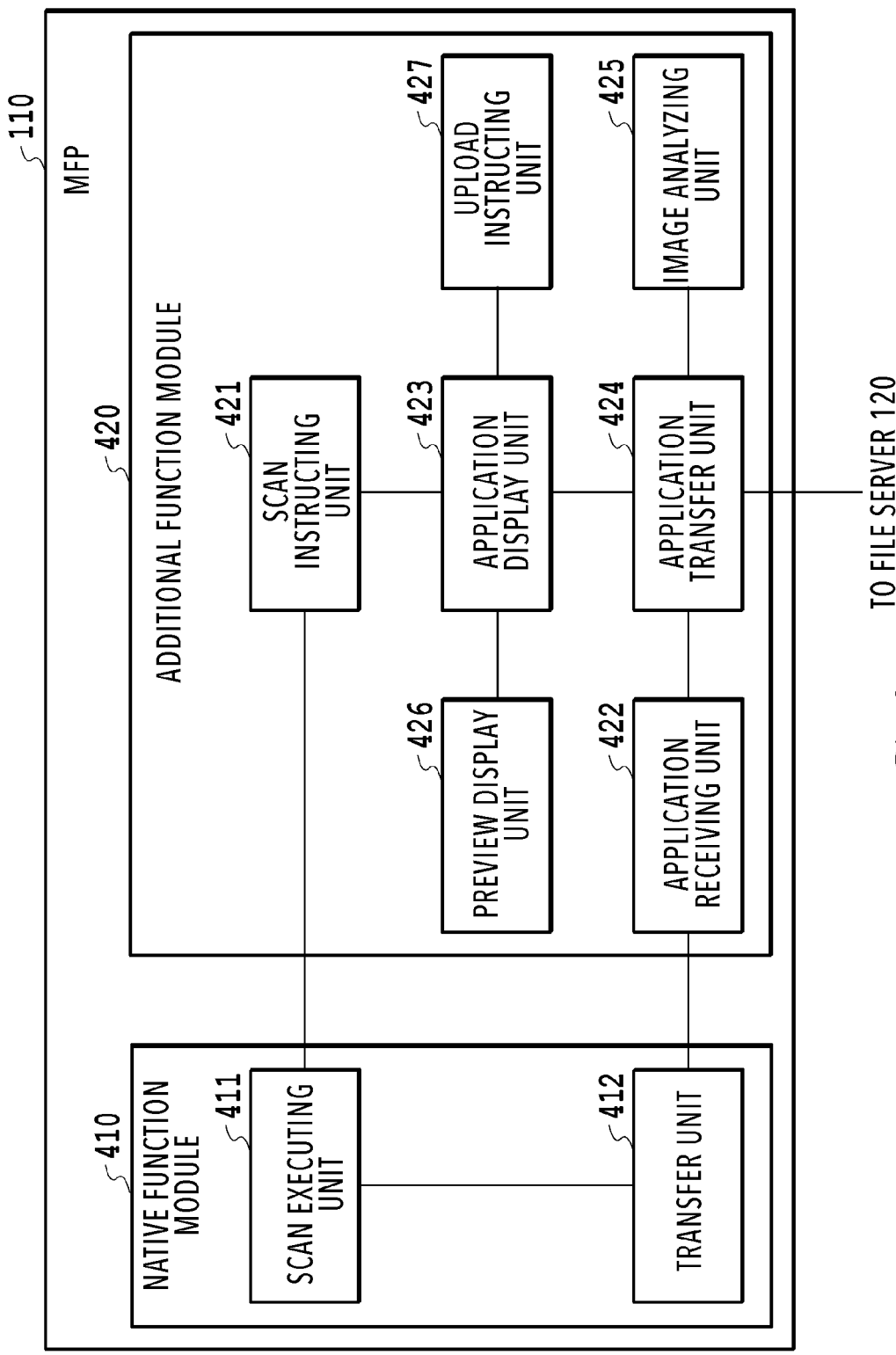
FIG. 4 is a diagram illustrating a software configuration of the MFP.

FIG. 4 is a diagram of a software configuration of the MFP 110. Software of the MFP 110 is roughly divided into two: a native function module 410 and an additional function module 420. Units included in the native function module 410 are function modules basically provided in the MFP 110. Meanwhile, units included in the additional function module 420 are function modules additionally provided in the MFP 110, such as a function module realized by installation of an application. The additional function module 420 of the present embodiment is a Java (registered trademark) based application and can easily realize addition of functions to the MFP 110. Incidentally, other applications (not shown) may be installed in the MFP 110. The units forming both function modules 410 and 420 will be described below.

An application display unit 423 performs display control to display a UI screen for receiving various types of operation by a user on a touch panel of the operating unit 220. The UI screen to be displayed will be described later in detail. A scan instructing unit 421 transmits a scan request including scan settings information and transfer setting information to a scan executing unit 411 in response to a user instruction inputted via the UI screen and causes the scan executing unit 411 to perform a scan process. The scan request also includes a request ID for identifying whether image data received by an application receiving unit 422, which will be described later, corresponds to the scan request.

If the scan request is received from the scan instructing unit 421, the scan executing unit 411 controls the scanner unit 222 via the scanner I/F 217 to perform the scan process. Accordingly, a document is scanned and image data is generated. The image data generated by scanning (hereinafter referred to as "scan image data") is passed to a transfer unit 412 together with the transfer setting information that specifies a destination of the image data. The transfer unit 412 transfers the scan image data received from the scan executing unit 411 according to the transfer settings. For the destination of the scan image data, the file server 120, a PC (not shown) on the LAN, or the like can be set. However, in the present embodiment, all of the scan image data generated by the scan executing unit 411 is supposed to be once transferred to the additional function module 420. The transfer unit 412 has a FTP (File Transfer Protocol) client function and transfers the scan image data by using a FTP to the application receiving unit 422 having a FTP server function.

The application receiving unit 422 receives the scan image data internally transferred from the transfer unit 412 and passes it to an application transfer unit 424. The application transfer unit 424 passes the received scan image data to an image analyzing unit 425. The image analyzing unit 425 performs an analysis process to the received scan image data, such as area division and character recognition processing (OCR processing). Then, the scan image data and the result of analysis processing are passed to a preview display unit 426 via the application transfer unit 424. Based on the scan image data and its analysis result, the preview display unit 426 generates a UI screen for a user to set a file name and performs display control such as displaying on a liquid crystal panel of the operating unit 220.

An upload instructing unit 427 generates a UI screen for a user to set a folder path and displays it on the touch panel of the operating unit 220. The application transfer unit 424 transfers (transmits) the scan image data to the file server 120. If the transfer is finished, the application transfer unit 424 notifies the application display unit 423 that the transfer has been finished. If the notification is received from the application transfer unit 424, the application display unit 423 updates a display content. Further, the application transfer unit 424 has a SMB (Server Message Block) client function. Accordingly, file operation and folder operation are performed to the file server 120 having a SMB server function by using a SMB. It should be noted that a protocol to be used is not limited to the SMB. WebDAV, FTP, SMTP, or the like may be used. Furthermore, a protocol other than the protocol used for the purpose of file transmission such as SOAP or REST may be used.

Figure 5:
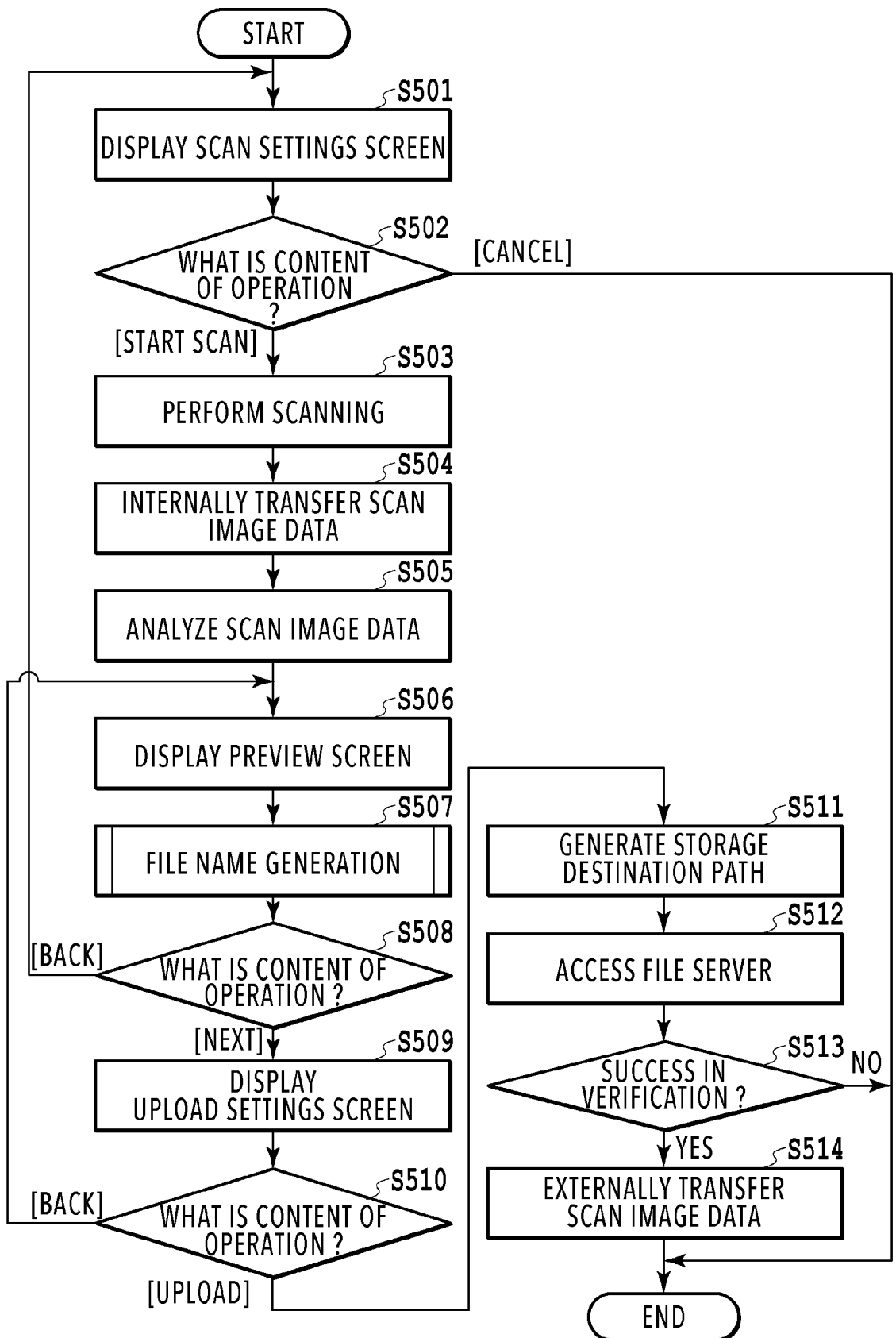
FIG. 5 is a flowchart illustrating a flow of operation control from generation to upload of a scan image.

Next, operation control in the MFP 110 in generating a scan image from a document and uploading it to the file server 120 will be described. FIG. 5 is a flowchart showing a flow of control from generation to upload of a scan image. The series of processes can be realized by the CPU 211 executing control programs stored in the HDD 214 in the control unit 210. Detailed description will be given below.

Figure 6:
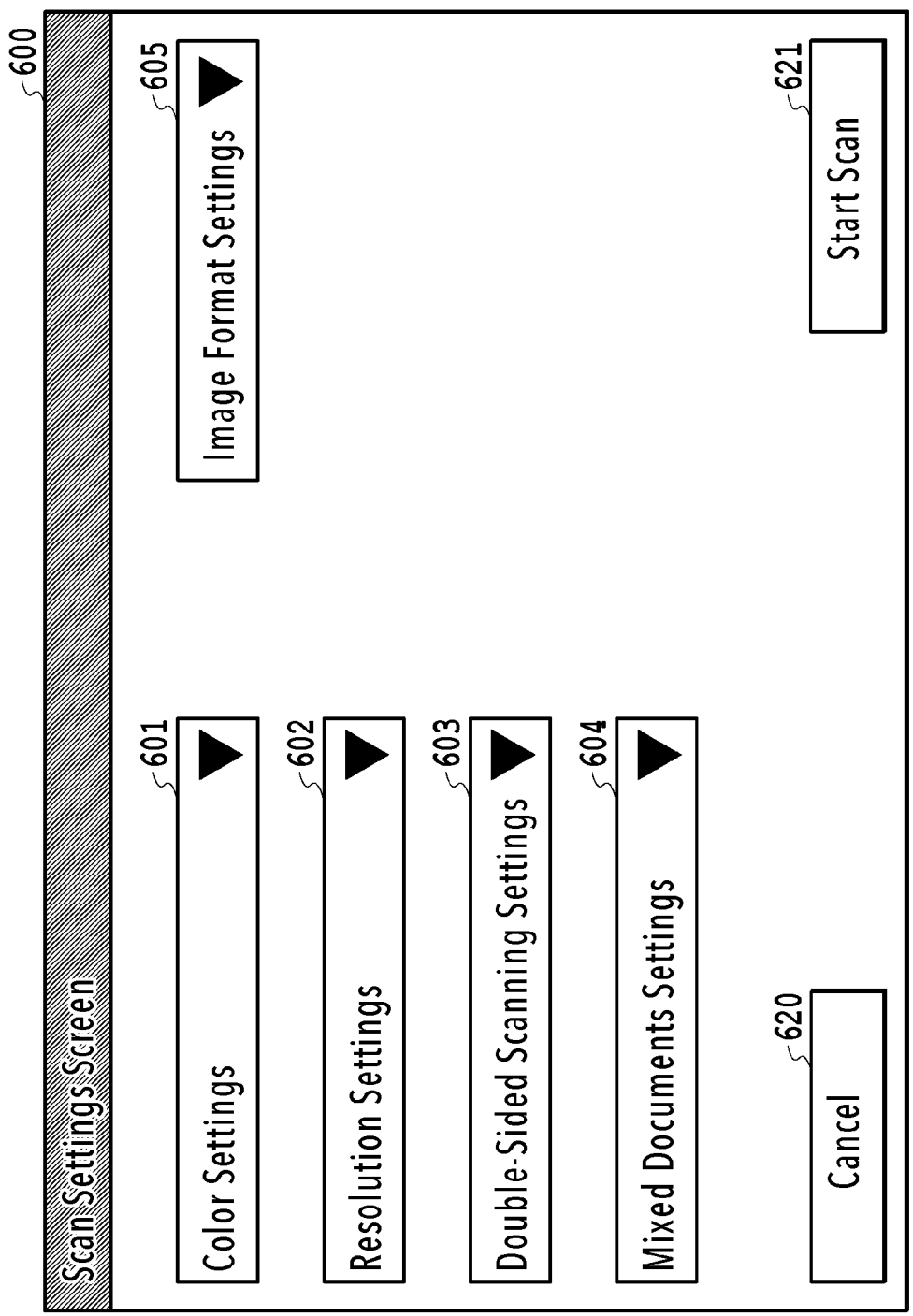
FIG. 6 shows an example of a scan settings screen.

In step 501, a UI screen (hereinafter referred to as a "scan settings screen") for making various settings for a scan process is displayed by the application display unit 423 on the touch panel of the operating unit 220. FIG. 6 shows an example of a scan settings screen. A scan settings screen 600 of FIG. 6 has five settings buttons 601 to 605. A [Color Settings] button 601 is a button for setting color/monochrome in scanning a document. A [Resolution Settings] button 602 is a button for setting a resolution in scanning a document. A [Double-Sided Scanning Settings] button 603 is a settings button used in need of scanning two sides of a document. A [Mixed Documents Settings] button 604 is a settings button used in need of scanning documents in different sizes at one time. An [Image Format Settings] button 605 is a settings button used in specifying a saving format of scan image data. In making settings using these settings buttons 601 to 605, candidates (options) that can be set within a range supported in the MFP 110 are displayed, and a user selects desired settings from the displayed candidates. It should be noted that the above settings buttons are described as examples. Not all of these setting items should be included, and setting items other than these setting items may be included. The user makes detailed settings relating to the scan process via the scan settings screen 600. A [Cancel] button 620 is a button used in stopping scan settings. A [Start Scan] button 621 is a button for instructing start of a scan process to a document set on a platen or the like.

In step 502, by the application display unit 423, processes are separated according to the contents of button operation by the user. In a case where pressing of the [Start Scan] button 621 is detected, the contents set by the settings buttons 601 to 605 and the receipt of starting the scan process are notified to the scan instructing unit 421 by the application display unit 423. Meanwhile, in a case where pressing of the [Cancel] button 620 is detected, the present process is finished.

In step 503, in response to an instruction from the scan instructing unit 421, the scan process is performed by the scan executing unit 411. In step 504, the thus obtained scan image data is internally transferred using the FTP to the application receiving unit 422 through the transfer unit 412, and further transmitted to the image analyzing unit 425 via the application transfer unit 424.

In step 505, in the image analyzing unit 425, an analysis process for the scan image data is performed. More specifically, first, with respect to the scan image data, binarization of image signals, correction of inclination of the document displaced in scanning, turning of the document in a positionally-correct direction, and the like are performed to correct the state of the scan image data so that the analysis process is smoothly performed. Then, edge extraction or the like is performed to the corrected scan image (binary image) to specify a character area (i.e., an area assumed to be one continuous character string) in the image. Table 1 below shows an example of results of an image analysis process performed to a portion of a scan image of a given quotation.

TABLE 1

| No. | X Coordinate of Area | Y Coordinate of Area | Area Width | Area Height |
|---|---|---|---|---|
| 1 | 55 | 5 | 20 | 10 |
| 2 | 5 | 20 | 30 | 5 |
| 3 | 38 | 20 | 10 | 5 |
| 4 | 78 | 20 | 33 | 5 |
| 5 | 78 | 28 | 40 | 5 |
| 6 | 5 | 35 | 23 | 5 |
| 7 | 5 | 45 | 33 | 5 |
| 8 | 75 | 40 | 43 | 5 |
| 9 | 75 | 50 | 43 | 5 |

In the above Table 1, [No.] indicates a unique number of each specified character area. In this example, serial numbers 1 to 9 are put in order of recognition. [X Coordinate of Area] indicates the X coordinate of the upper left corner of each specified character area. [Y Coordinate of Area] indicates the Y coordinate of the upper left corner of each specified character area. Hereinafter, in using the term "coordinate(s)" for a character area, the term refers to position coordinates of the upper left corner of a character area unless otherwise specified. [Area Width] indicates a distance between the left side and the right side of each specified character area. [Area Height] indicates a distance between the upper side and the lower side of each specified character area. In the present embodiment, [X Coordinate of Area], [Y Coordinate of Area], [Area Width], and [Area Height] are all represented by pixels, but they may also be represented by points, inches, or the like. Information on each character area extracted from the scan image (hereinafter referred to as "character area information") is passed to the application transfer unit 424 as image analysis data. The image analysis data is in a CSV or XML format, for example, but may be in other formats. Further, the image analysis data may be passed at a predetermined timing after temporarily stored in the HDD 214.

Figure 7B:
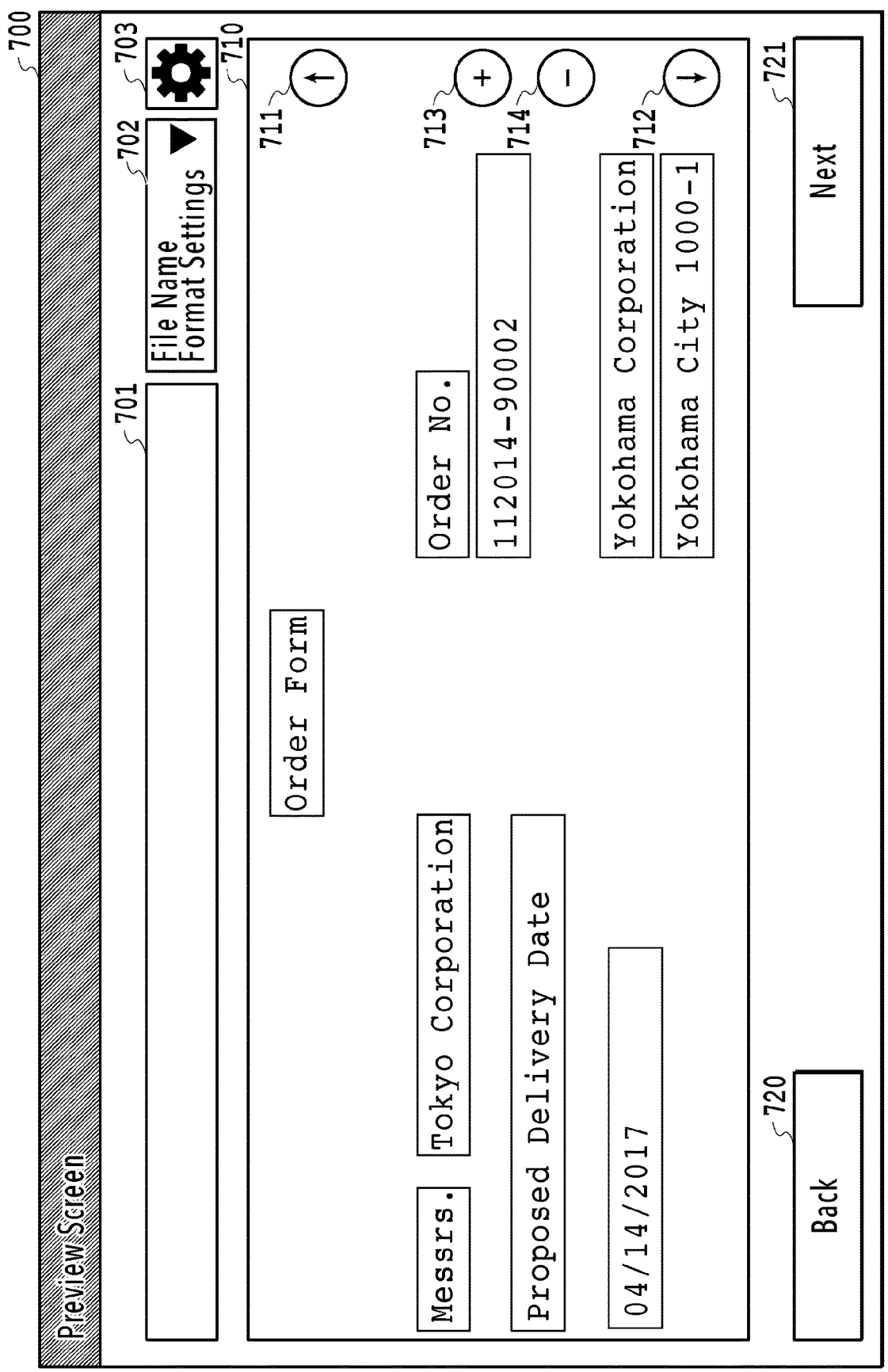

In step 506, the scan image obtained in step 503 is preview displayed by the preview display unit 426 on the touch panel of the operating unit 220. Screen data for the preview display is generated and provided by the application display unit 423. The user can set a file name of the scan image data via the UI screen (hereinafter referred to as a "preview screen") in which a scan image is preview displayed. FIG. 7A shows an example of a preview screen. In a preview screen 700, the obtained scan image is displayed in a preview area 710 located in the center of the screen. Further, in the preview area 710, together with the scan image, a plurality of buttons 711 to 714 are also displayed for changing a display state of the scan image. The buttons 711 and 712 appear when the entire scan image cannot be displayed and are used for scrolling the display area in a vertical direction. Usually, the size of the touch panel provided in the MFP 110 is not that large. Accordingly, for example, in a case where the scan image is obtained by scanning a document in A4-size, portrait, with horizontal writing, an initial setting is made so that the scan image is top-aligned, scaled-down, and displayed with its entire width direction (lateral direction) just fitted into the preview area 710. That is, in the initial setting, a lower part of the A4-size, portrait scan image is not displayed within the preview area 710. In this case, by pressing the "↓" button 712, the display area is scrolled down and the lower part can be displayed. Furthermore, in a case where the scan image is A4-size landscape, A3-size, or the like, a button for scrolling the display area in a horizontal direction may further be provided. The buttons 713 and 714 are buttons for the scaling of the display area. Pressing the "+" button 713 allows zooming in, and pressing the "−" button 714 allows zooming out. Actions by the button operation may be realized by operation with user's fingers, such as swipe, pinch in/pinch out on the preview screen. In the preview area 710, a character area specified in the image analysis process in step 505 is displayed in a recognizable manner to the user based on the above-described character area information. FIG. 7B shows a state where each character area is displayed in a recognizable manner by a box in the preview screen 700 shown in FIG. 7A, and character areas correspond to the serial numbers 1 to 9 in the above Table 1. If the user selects (e.g., touches with a finger) any character area from the character areas displayed in the preview area 710, a character string included in the character area is displayed, that is, automatically inputted, in a file name input field 701 and becomes part of character strings forming a file name. Furthermore, the user can set a format of a file name in the preview screen 700. The format of a file name is a combination of an "item" representing a content of a unit character string which is a constituent element of a file name and a "delimiter," if there are a plurality of items, that connects the plurality of items. Examples of the item include "document type," "company name," "order number," "delivery date," or the like. Examples of the delimiter include a hyphen "-," an underscore "_," or the like. Table 2 below shows a list of examples of the file name format.

TABLE 2

| No. | Display name |
|---|---|
| 1 | <document type>-<company name>-<order number> |
| 2 | <company name>-<order number>-<document type> |
| 3 | <order number>-<document type>-<company name> |
| 4 | <document type>-<company name>-<delivery date> |

If the user presses a [File Name Format Settings] button 702, a list as shown in the above Table 2 is list displayed as candidates for file name formats. Then, if the user selects a desired format from the displayed candidates, a file name format to be applied is determined. A [Back] button 720 is a button used in stopping preview display. A [Next] button 721 is a button used to move to a screen for setting an upload destination of obtained scan image data. It should be noted that the above types of various buttons and aspects of display and selection of character areas are described as examples, and they are not limited to these examples. For instance, there may be a button for correcting and changing character strings displayed in the file name input field 701 or for confirming a file name. Incidentally, a button 703 will be described later.

Figure 8:
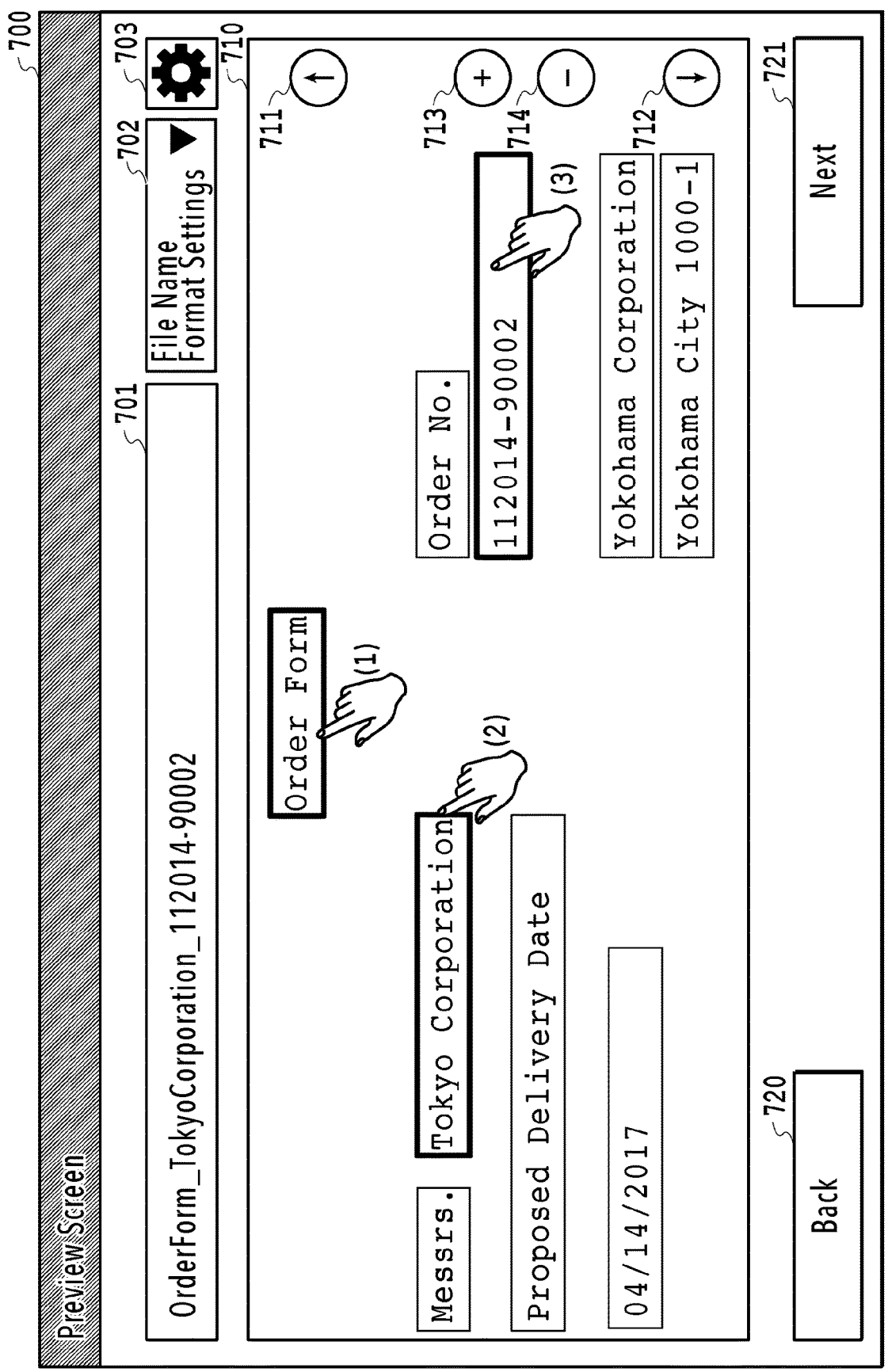
FIG. 8 shows a state where a file name is generated on the preview screen.

In step 507, a file name for the obtained scan image is generated by the preview display unit 426. FIG. 8 shows a state of the preview screen 700 after generating a file name. In this example, by sequentially selecting the character areas corresponding to "Order Form," "Tokyo Corporation," and "112014-90002," the character string "OrderForm_Tokyo-Corporation_112014-90002" is displayed in the file name input field 701. Furthermore, in the preview area 710, boxes of the character areas touched by the user are changed to thick boxes to indicate that they are selected as part of a file name. Details of the file name generating process will be described later. After a desired file name is generated and the user presses the [Next] button 721, the process advances to step 508.

In step 508, like step 502, by the preview display unit 426, processes are separated according to the contents of button operation by the user. In a case where pressing of the [Next] button 721 is detected, information on a file name (a character string set as a file name) being displayed in the file name input field 701 is transmitted to the upload instructing unit 427, and the process advances to step 509. Meanwhile, in a case where pressing of the [Back] button 720 is detected, the process goes back to step 501 (display in the scan settings screen).

Figure 9:
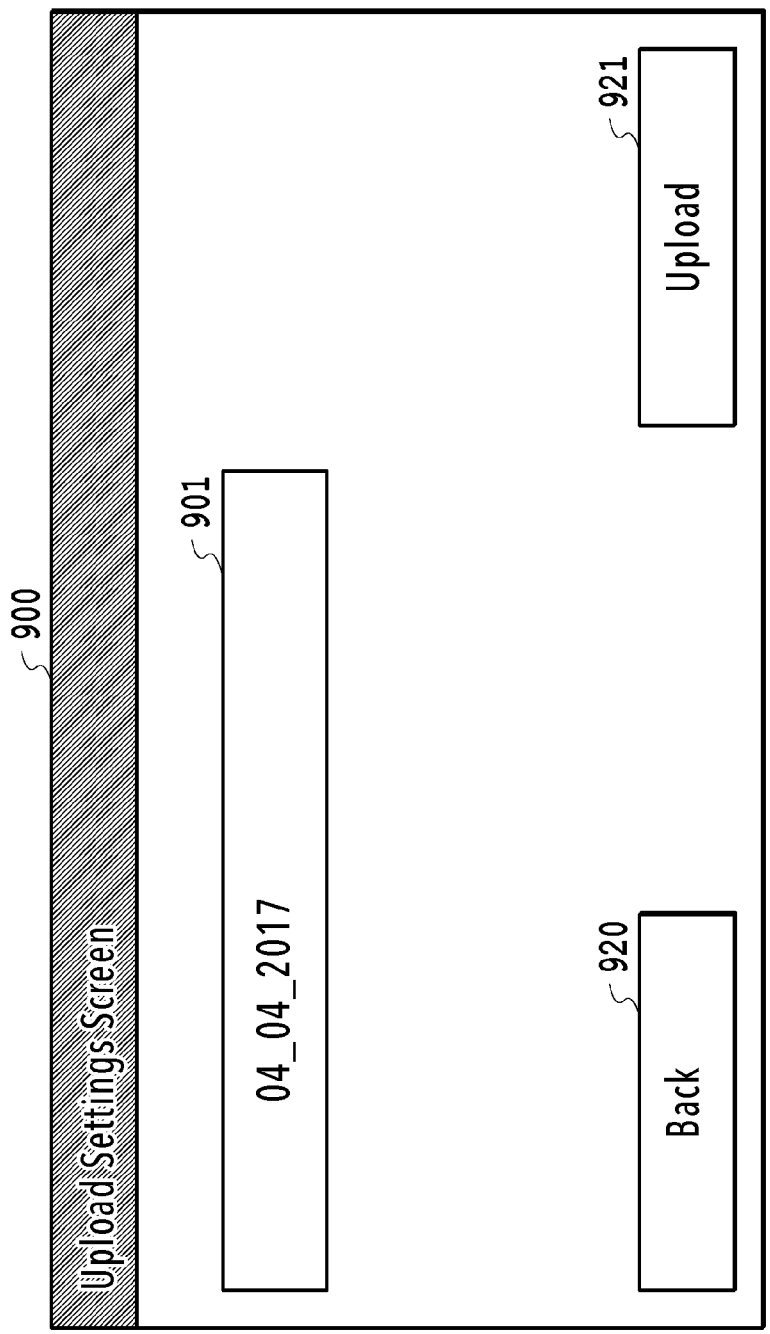
FIG. 9 shows an example of an upload settings screen.

In step 509, a UI screen (hereinafter referred to as an "upload settings screen") for setting a transfer destination of the scan image data is displayed by the upload instructing unit 427 on the touch panel of the operating unit 220. The user makes detailed settings relating to upload to the file server 120 via the upload settings screen. FIG. 9 shows an example of the upload settings screen. The user inputs, to a folder path input field 901, a name of a folder path (a path name) in external transfer to the file server 120. In the example of FIG. 9, "04_04_2017" is inputted as a path name. An example of the inputting method is a method for displaying a subwindow (not shown) of a keyboard screen in response to tapping on the folder path input field 901 and prompting the user to input a path name via the keyboard screen. Alternatively, a path name may be selected and set from an address book stored in the HDD 214. A [Back] button 920 is a button used in stopping detailed settings relating to upload. An [Upload] button 921 is a button for instructing upload to the folder path that is set in the folder path input field 901.

In step 510, like step 508, by the upload instructing unit 427, processes are separated according to the contents of button operation by the user. In a case where pressing of the [Upload] button 921 is detected, the process advances to step 511. At this time, a path name inputted to the folder path input field 901, a file name generated in step 507, and various types of information on file server settings are passed to the application transfer unit 424. Incidentally, the file server settings are necessary information for storing scan image data in the file server 120 and specifically include information such as a host name, a starting point of a folder path, and a user name and a password for login. Meanwhile, in a case where pressing of the [Back] button 920 is detected, the process goes back to step 506 (display in the preview screen).

In step 511, a storage destination path for the scan image data is generated by the application transfer unit 424 based on the information received from the upload instructing unit 427. More specifically, a storage destination path is generated by adding a folder path to the file server settings (a host name of the file server 120, a starting point of the folder path). Accordingly, a storage destination path, for example, "¥¥server01¥Share¥04_04_2017" is generated. Then, in step 512, access to the file server 120 is performed by the application transfer unit 424. At this time, a user name and a password included in the file server settings are transmitted to the file server 120. In the file server 120 that has received the user name and the password, a verification process is performed.

In step 513, by the application transfer unit 424, processes are separated according to the verification result in the file server 120. That is, in a case where a notification of success in verification is received from the file server 120, the process advances to step 514. Meanwhile, in a case where a notification of failure in verification is received, the present process is finished.

In step 514, the scan image data is externally transferred by the application transfer unit 424 to a folder indicated by the storage destination path generated in step 511 and stored in the file server 120.

The above description is the content of operation control from generation to upload of a scan image according to the present embodiment. It should be noted that in the present embodiment, it is assumed that the processes in step 505 to step 507 are performed to the image data corresponding to one page generated by scanning. For instance, a button for performing image analysis on the next page may be provided in the preview screen 700, and the next page obtained by the analysis may be preview displayed, so that character strings forming a file name can be set from character areas in the following pages.

<File name Generation>

Figure 10:
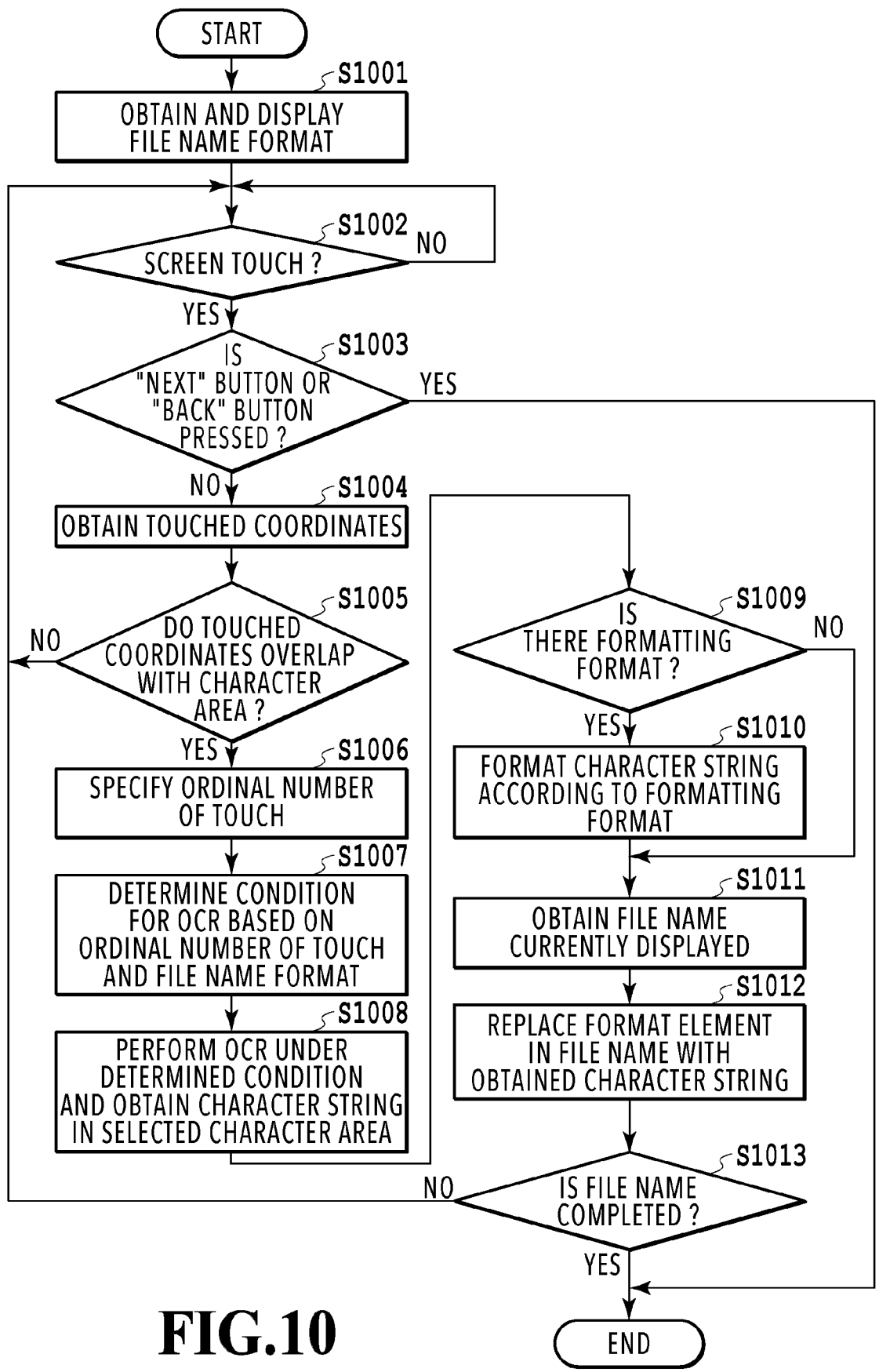
FIG. 10 is a flowchart illustrating details of a file name generating process.

FIG. 10 is a flowchart illustrating details of the file name generating process (step 507) in the preview display unit 426. Description will be given in accordance with the flow of FIG. 10.

In step 1001, a currently set file name format is obtained, and a content of the obtained file name format is displayed in the file name input field 701. At this time, displaying the obtained file name format in light color with, for example, gray characters having a low density or the like allows a user to recognize a character area that should be selected from now on. Now it is assumed that a file name format No. 4 in the above Table 2 is selected via the [File Name Format Settings] button 702. In this case, "<document type>-<company name>-<delivery date>" is displayed as a temporary file name in the file name input field 701. A display example of the file name is shown in FIG. 11A. Display in light color with a low density shows that none of the items are selected. It should be noted that a user may be prompted to set a file name format by message display or the like at the start of the present process, or a user may appropriately change a predetermined file name format which is preset and displayed as an initial value, if needed.

In step 1002, presence or absence of touch operation by the user on the preview screen 700 displayed on the touch panel is monitored. If touch operation is detected, the process advances to step 1003. In the following step 1003, processes are separated according to the content of the touch operation. In a case where the content of the touch operation is pressing of the [Next] button 721 or the [Back] button 720, the present process is finished. In a case where the content of the touch operation is not pressing of the [Next] button 721 or the [Back] button 720, the process advances to step 1004.

In step 1004, position coordinates (x, y) on the touch panel on which the touch operation is performed are obtained. In the following step 1005, it is determined with which character area the position coordinates relating to the touch operation overlap. For example, in the above-mentioned preview screen 700 of FIG. 7B, determination is made based on whether the position coordinates relating to the touch operation are included within each character area displayed in the preview area 710 (within a rectangle specified by the position coordinates representing four corners of the character area). In a case where the position coordinates relating to the touch operation overlap with one of character areas, the process advances to step 1006. Meanwhile, in a case where the position coordinates relating to the touch operation overlap with none of character areas, the process goes back to step 1002.

In step 1006, an ordinal number of the touch operation (selection order) on a character area in the scan image is specified. More specifically, first, a current display content in the file name input field 701 is obtained. Then, of the obtained display content, the number of character strings (character strings replaced in step 1012 (described later)) corresponding to the items of the file name format is obtained. Then, 1 is added to the number, and the resultant is specified as an ordinal number of touch operation. Now it is assumed that "OrderForm-TokyoCorporation-<delivery date>," for example, is currently displayed in the file name input field 701. In this state, in a case where touch operation on a character area of "112014-90002" is detected, an ordinal number of touch operation is '2+1=3.' It should be noted that a notification of the total number of character areas requiring touch operation may be displayed so that an ordinal number of touch operation does not exceed the number of items forming a file name format. Furthermore, an error message or the like may be displayed in a case of detecting touch operation more than necessary.

In step 1007, based on the ordinal number of touch operation (selection order) specified in step 1006 and the file name format obtained in step 1001, conditions for OCR processing to be applied are determined in the following step 1008. At this time, a database (hereinafter referred to as condition DB) storing various conditions for OCR processing prepared in advance is referenced. The conditions for OCR processing are composed of a plurality of parameters (in this example, "type," "OCR language," "additional character," and "formatting format") and are associated with the above-mentioned items forming a file name. In the present embodiment, the maximum number of parameters is four, and the content of each parameter is shown below. First, "type" indicates an attribute of a target character string. "OCR language" is a concept including not only a language such as English and Japanese, which the term originally means, but also numbers or the like. This "OCR language" specifies the type of dictionary data to be used. The dictionary data of an "English" OCR language is suitable for character recognizing of alphabets and numbers. The dictionary data of a "Japanese" OCR language is suitable for character recognizing of Japanese characters, alphabets and numbers. The dictionary data of a "numbers" OCR language is suitable for character recognizing of numbers. "Additional character" defines a character that should be recognized in addition to words in the dictionary data. "Formatting format" defines a format in formatting a scanned character string in post-processing. Table 3 shows an example of the condition DB for OCR processing.

TABLE 3

| Item name | Type | OCR language | Additional characters | Formatting format |
| --- | --- | --- | --- | --- |
| document type | text | English | — | — |
| company name | text | English, numbers | — | — |
| order number | number | numbers | — | — |
| delivery date | date | numbers | / | MMddyyyy |

Figure 1:
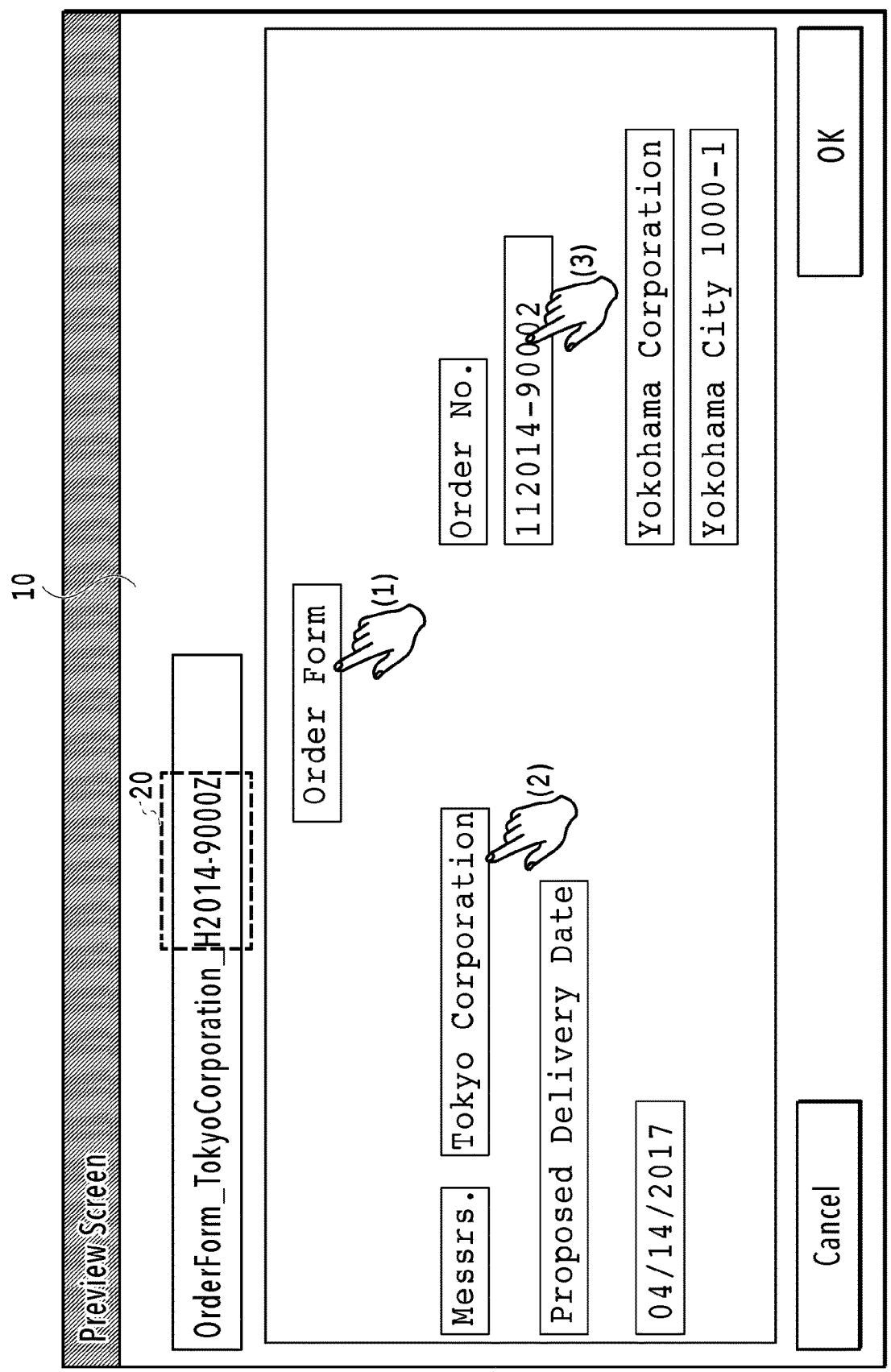
FIG. 1 is a diagram illustrating a problem of the prior art.

It should be noted that in a case where "OCR language" is 'English,' since character recognition is performed using English dictionary data by an OCR algorithm for English, character strings in languages other than 'English' will not be recognized. Then, a plurality of languages such as 'Japanese, Chinese, German' and 'numbers, katakana' are specified for "OCR language," for example, and a plurality of OCR algorithms adapted to the plurality of languages may be applied. Further, as "OCR language" variations, an address book or the like including information such as company names and telephone numbers may be specified. Furthermore, in the present embodiment, the condition DB defining conditions corresponding to each item forming a format is used. However, for example, a condition DB in which a format and a condition are associated with each other one by one may be used. In this manner, by determining conditions for OCR processing based on a preset format and selection order of a character area by a user, an appropriate OCR language is applied to each character area. For example, the OCR processing for the order number is executed with the "numbers" dictionary data. As a result, it is possible to reduce error recognition, such as a case where the portion "11" of "112014" is erroneously recognized as the alphabet "H" as shown in FIG. 1.

For example, in a case where a file name format is "<document type>_<company name>_<delivery date>" and an ordinal number of touch operation is '3,' conditions for OCR processing to a character area relating to the touch operation are determined in the following manner.

First, a file name format "<document type>-<company name>-<delivery date>" to be applied is separated by a delimiter (underscore). Then, the first item is <document type>, the second item is <company name>, and the third item is <delivery date>. If the ordinal number of touch operation is "3," then the third item <delivery date> becomes a target for OCR processing. With reference to the condition DB in Table 3, parameters associated with <delivery date> are determined as conditions for OCR processing. That is, "date," which indicates an attribute of a target character string, "numbers," which indicates the type of dictionary data to be used, "/," which indicates a character subjected to additional character recognition, and formatting the extracted character string by "MMddyyyy" are determined to be the conditions for OCR processing performed on the character area receiving touch operation.

In step 1008, a character string in the character area overlapping with the position coordinates relating to the touch operation is obtained. At this time, information on the conditions for OCR processing determined in step 1007 and information on the position coordinates of the character area determined to have an overlap in step 1005 are passed to the image analyzing unit 425, and in the image analyzing unit 425, OCR processing is performed according to the received information. Then, a character recognition result obtained in the OCR processing is passed to the preview display unit 426.

In step 1009, it is determined whether the conditions for OCR processing determined in step 1007 include "formatting format." If "formatting format" is included, in step 1010, the character string obtained in step 1008 is formatted according to the formatting format. For instance, the above-mentioned "MMddyyyy" is a format in which character strings representing a date are combined, where "yyyy" represents a year in the Christian Era in 4-digit number, "MM" represents a month in 2-digit number, and "dd" represents a date in 2-digit number. Accordingly, in a case where a character area of "04/14/2017" receives touch operation, first, a character string of "04/14/2017" is scanned, and then the character string is formatted to "04142017" by the formatting format "MMddyyyy." Meanwhile, if the conditions for OCR processing determined in step 1007 do not include "formatting format," the process advances to step 1011.

In step 1011, a content currently displayed in the file name input field 701 is obtained. The obtained display content at least in part includes an item name (hereinafter referred to as a "format element") which is a constituent element of a file name format obtained and displayed in step 1001. Then, in step 1012, the character string obtained in step 1008 (or the character string formatted in step 1010) is replaced with a corresponding format element in the display content obtained in this step.

In step 1013, it is determined whether a file name according to the file name format obtained in step 1001 is completed. At this time, if all of the format elements displayed in the file name input field 701 are replaced with recognized character strings and the display content in the file name input field 701 is entirely displayed with dark characters, a file name is completed. As a result of determination, if a file name is completed, the present process is finished. Meanwhile, if a file name is uncompleted, the process goes back to step 1002 and the process is continued.

The above description is the content of the file name generating process. FIG. 11B to FIG. 11D show transition of the display content in the file name input field 701, from the above-described state of FIG. 11A to completion of a file name through touch operation sequentially performed by a user on the character areas of "Order Form," "Tokyo Corporation," and "04/14/2017." First, FIG. 11B shows a state of the file name input field 701 after the first touch operation on the character area of "Order Form" is performed. At this stage, a format element <document type> is replaced with a recognized character string "OrderForm" obtained in the OCR processing to a character area 815. Then, to indicate that touch operation on the character area corresponding to <document type> is already finished, the character string "OrderForm" and a delimiter, an underscore "_" next to "OrderForm," are displayed in dark color. Then, FIG. 11C shows a state of the file name input field 701 after touch operation on the character area of "Tokyo Corporation" is performed following the character area of "Order Form." At this state, a format element <company name> is replaced with a recognized character string "TokyoCorporation" obtained in the OCR processing to a character area 816. Then, like FIG. 11B, "TokyoCorporation" and a delimiter, an underscore "_" next to "TokyoCorporation," are displayed in dark color. FIG. 11D shows a state of the file name input field 701 after touch operation on the character area of "04/14/2017" is finally performed. At this time, a format element <delivery date> is replaced with the character string "04142017" after formatting a recognized character string obtained in the OCR processing to a character area 817. Then, the character strings including "04142017" are displayed in dark color, and a file name corresponding to the set file name format is completed.

It should be noted that in the present embodiment, in the display content in the file name input field 701, portions replaced with recognized character strings as a result of touch operation by a user are displayed in dark color and portions that have not been replaced yet are displayed in light color. However, the present invention is not limited to this. For example, it may be determined whether or not touch operation on a portion is already finished according to a method such as highlighting a portion replaced with a recognized character string and italicizing a portion that has not been replaced yet. Furthermore, a message prompting for touch operation or the like may be displayed only for a portion that has not been replaced yet.

Further, in the present embodiment, description has been given of an example of a situation of setting a file name by using character recognition results of the character areas in the scan image. However, the scope of application of the present invention is not limited to the situation of setting a file name. For example, the present invention is applicable to data transfer destination settings such as an upload destination of a scan image or destination settings in FAX transmission or email transmission. In this case, for example, in the above-described upload settings screen 900 shown in FIG. 9, a format settings button (not shown) for a folder path is provided so that a user can select and set a format of a folder path from a plurality of candidates. Furthermore, in a destination settings screen (not shown), a user can set a format for a FAX number or email address in the same manner. Then, OCR processing for setting a folder path, FAX number, email address may be performed under conditions according to the set format. In this manner, in a situation of setting various types of information relating to a scan image (supplementary information), such as setting a transfer destination of scan image data or the like, the present invention is widely applicable.

Figure 12:
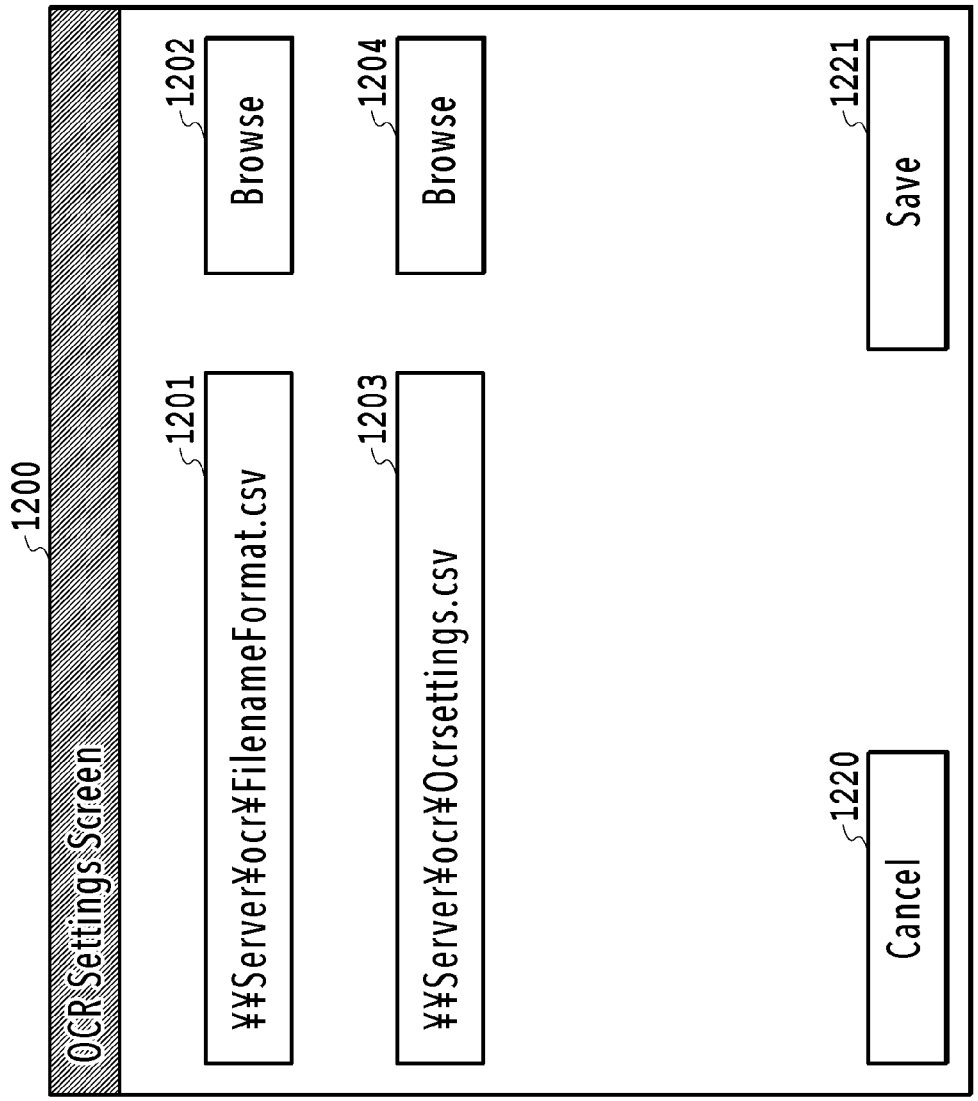
FIG. 12 shows an example of an OCR settings screen.

Furthermore, a user or a manager may appropriately edit by addition, deletion, and change, candidates for a file name format (see Table 2) or a condition DB for OCR processing corresponding to each candidate (see Table 3). FIG. 12 shows an example of a UI screen (an OCR settings screen) for a user to change settings of candidates for a file name format and conditions for OCR processing resulting from editing the candidates. An OCR settings screen 1200 is displayed as a subwindow, for example, by pressing the button 703 in the preview screen 700 of FIG. 7B. An input field 1201 is an area displaying a file path of, for example, a list in an XML format, in which one or more file name formats are indicated. A user follows, for example, folders on the file server 120 by pressing a [Browse] button 1202 and specifies a file path where the list is located. Then, the specified file path is displayed in the input field 1201. After that, if a [Save] button 1221 is pressed, the list is loaded from the file path being displayed in the input field 1201 and is stored in a RAM 213 or a HDD 214. Then, a file name format included in the list is displayed as a candidate for new selection in response to the pressing of the file name format settings button 702. In the same manner, an input field 1203 displays a file path of, for example, a list including conditions for OCR processing. The user follows, for example, folders on the file server 120 by pressing a [Browse] button 1204 and specifies a file path where the list is located. Then, the specified file path is displayed in the input field 1203. After that, if a [Save] button 1221 is pressed, the list is loaded from the file path being displayed in the input field 1203 and is stored in the RAM 213 or the HDD 214. Then, the content included in the list becomes a new condition DB for OCR processing. A [Cancel] button 1220 is a button for canceling the operation and closing the OCR settings screen 1200. The user can edit candidates for a file name format and conditions for OCR processing by the OCR settings screen 1200. It should be noted that the above-described editing method is an example. For instance, a list may be displayed and stored, for example, by accessing a web service from a web browser or a user may directly enter and set a file path in the input fields 1201 and 1203.

As described above, according to the present embodiment, in a situation of setting a file name and the like by performing OCR processing to a scan image, conditions for the OCR processing are appropriately set according to a format that is set separately. This allows increase in a character recognition rate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a situation of setting a file name and the like by using a character string obtained by performing OCR processing to a scan image, appropriate conditions can be set according to a character string to be scanned. This allows increase in a character recognition rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-159537, filed Aug. 22, 2017 which is hereby incorporated by reference wherein in its entirety.

What is claimed is:

1. An apparatus for performing a predetermined process to a scan image obtained by scanning a document, comprising:
   a memory that stores a program; and
   a processor that executes the program to perform:
   controlling to display the scan image on a UI screen, wherein a user can select a plurality of character areas in order on the displayed scan image;
   determining, based on a selection order in which the plurality of character areas are selected by the user, parameters of OCR processing to be applied to the selected plurality of character areas;
   performing OCR processing according to the determined parameters for the selected plurality of character areas; and setting supplementary information for the predetermined process based on character strings that are extracted by performing the OCR processing according to the determined parameters for the selected plurality of character areas.

2. The apparatus according to claim 1, wherein the processor controls to further display a format of the supplementary information on the UI screen together with the scan image, wherein the format includes items that indicate an order of character areas to be sequentially selected by the user.

3. The apparatus according to claim 2, wherein the processor displays the format so that an item corresponding to character area which has already been selected by the user and an item corresponding to character area which has not been selected yet are displayed in a recognizable manner.

4. The apparatus according to claim 2, wherein the parameters of the OCR processing are prepared in advance in association with the item.

5. The apparatus according to claim 1, wherein the parameters of the OCR processing include at least information specifying an OCR language.

6. The apparatus according to claim 1, wherein the parameters of the OCR processing include at least one of information specifying an OCR language, information defining a character that should be recognized in addition to characters in dictionary data corresponding to the OCR language and information defining a format in formatting the extracted character string in post-processing.

7. The apparatus according to claim 2, wherein the format of the supplementary information is determined based on a user instruction via the UI screen.

8. The apparatus according to claim 7, wherein the processor further displays candidates for a format of the supplementary information on the UI screen and causes a user to select a desired format from the candidates.

9. The apparatus according to claim 1, wherein
the predetermined process is a process for storing the scan image, and
the supplementary information is a file name in storing the scan image.

10. The apparatus according to claim 1, wherein
the predetermined process is a process for uploading the scan image to a predetermined transfer destination, and
the supplementary information is a path name representing the transfer destination.

11. The apparatus according to claim 1, wherein
the predetermined process is a process for faxing the scan image, and
the supplementary information is a facsimile number.

12. The apparatus according to claim 1, wherein
the predetermined process is a process for transmitting the scan image by email, and
the supplementary information is an email address.

13. A control method of an apparatus for performing a predetermined process to a scan image obtained by scanning a document, the control method comprising the steps of:
controlling to display the scan image on a UI screen, wherein a user can select a plurality of character areas in order on the displayed scan image;
determining, based on a selection order in which the plurality of character areas are selected by the user, parameters of OCR processing to be applied to the selected plurality of character areas;
performing OCR processing according to the determined parameters for the selected plurality of character areas; and
setting supplementary information for the predetermined process based on character strings that are extracted by performing the OCR processing according to the determined parameters for the selected plurality of character areas.

14. A non-transitory computer readable storage medium storing a program for causing a computer to perform a control method of an apparatus for performing a predetermined process to a scan image obtained by scanning a document, the control method comprising the steps of:
controlling to display the scan image on a UI screen, wherein a user can select a plurality of character areas in order on the displayed scan image;
determining, based on a selection order in which the plurality of character areas are selected by the user, parameters of OCR processing to be applied to the selected plurality of character areas;
performing OCR processing according to the determined parameters for the selected plurality of character areas; and
setting supplementary information for the predetermined process based on character strings that are extracted by performing the OCR processing according to the determined parameters for the selected plurality of character areas.

* * * * *